Aug. 5, 1952 — D. G. LA RUE — 2,606,039

CARGO TANK MOUNT

Filed Dec. 10, 1948

Inventor
DONALD G. LA RUE.
By James E. Toomey
agt.
ATTORNEY

Patented Aug. 5, 1952

2,606,039

UNITED STATES PATENT OFFICE 2,606,039

CARGO TANK MOUNT

Donald G. La Rue, Oakland, Calif., assignor to Kaiser Aluminum & Chemical Corporation, a corporation of Delaware Application December 10, 1948, Serial No. 64,599

8 Claims. (Cl. 280—143)

This invention relates to improvements in mounting vehicle bodies and more particularly to cushioned mountings for cargo tanks on trucks or trailers drawn by the same.

Heretofore various devices have been employed for providing a cushioned mounting for cargo tanks upon the chassis frame of a truck in order to dampen stresses or strains which occur in the cargo tank because of the shifting of the liquid therein as the truck passes over an uneven portion of the highway. However, these devices have proved unsatisfactory since they are usually complex, expensive to manufacture and comprise a number of integrated parts, the loss of any one of which was fatal to the continued and successful use of the device as a whole and could not be easily replaced when lost.

Accordingly, it is an object of this invention to provide cargo tank mounts which are of relatively simple construction, are easily assembled or dismantled, cheap to manufacture, and comprised of parts that are easily replaceable.

It is a further object of this invention to provide a cargo tank mount which will not only serve the purpose of resiliently mounting a cargo tank upon the chassis frame of a truck but will contemporaneously serve as a cradle or support for the same, being so constructed that lateral and/or longitudinal movement of the cargo tank upon the chassis of the truck, because of jarring, etc., will be arrested.

An additional object of the invention is the provision of a cargo tank mount which furnishes both a dampening and shock absorber action over a wide range of loads which vary from the tare weight to the fully loaded weight.

Another object of this invention is to provide shock absorbers for cargo tanks which absorb impacts in a vertical, lateral or longitudinal direction thereby effectively reducing vibration.

The cargo tank mounts of the present invention generally comprise a plurality of lower channel shaped bolsters, strips of resilient material positioned within the channels of each of said bolsters and a plurality of upper channel shaped bolsters resiliently mounted within the channels of the lower bolsters by means of the aforementioned strips of resilient material.

Further objects and advantages of the invention will be apparent from the following detailed description taken in conjunction with the drawings wherein.

Figure 1:
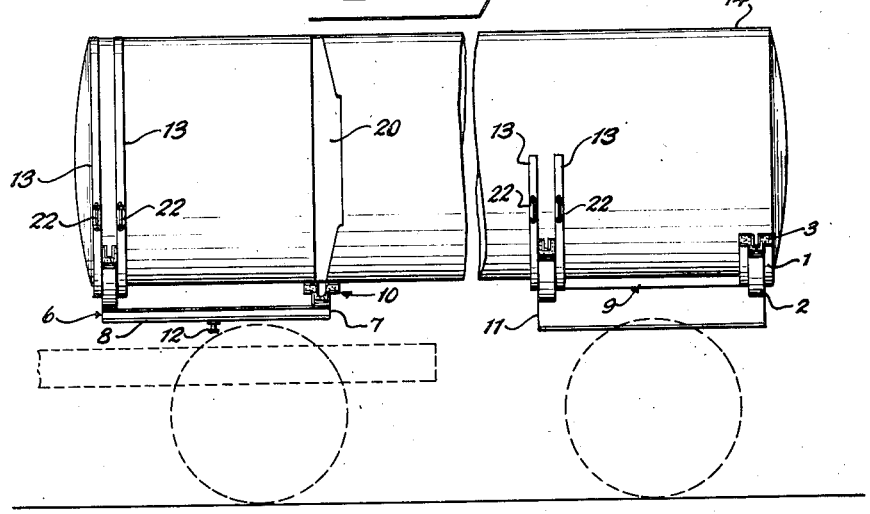
Fig. 1 is a side elevational view partially in section of a conventional cargo tank trailer wherein the cargo tank is mounted by the device disclosed in the present invention.
Figures 2, 3, 4:
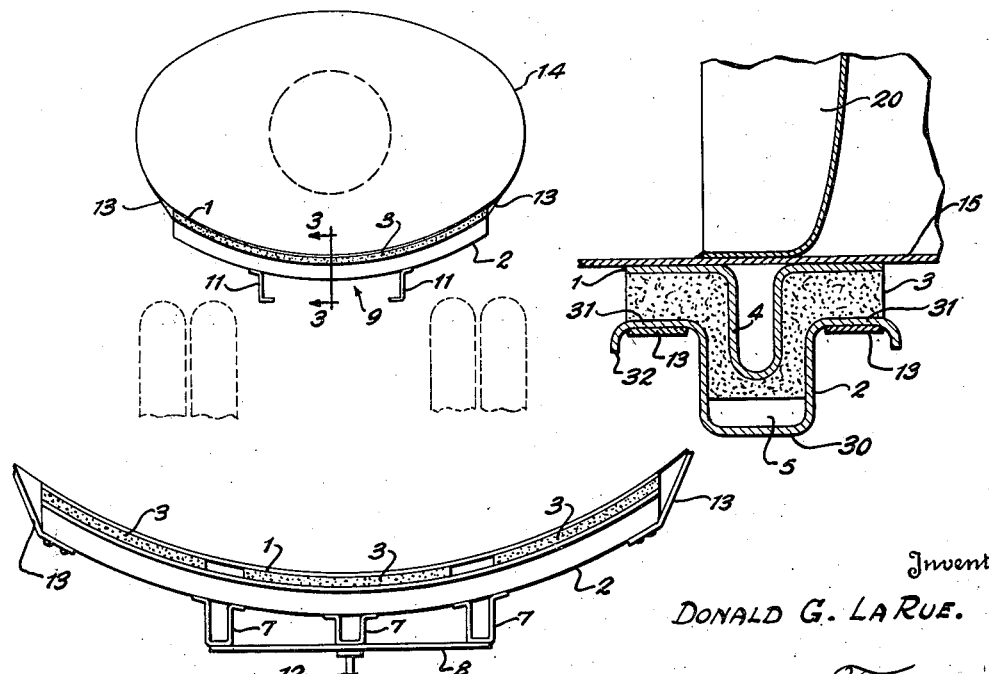
Fig. 2 is an elevational rear view of the cargo tank trailer shown in Fig. 1.
Fig. 3 is an enlarged sectional view of an individual tank mount taken along lines 3—3 of Fig. 2 and at a point 10 such as is shown in Fig. 1.
Fig. 4 is a frontal elevational view of the fifth wheel of a trailer with the tank mount positioned thereof.

With further reference to the drawings and particularly Fig. 3, the cargo tank mount of the present invention is comprised of a pair of longitudinally curved, channel shaped strips constituting bolsters 1 and 2. By sandwiching a piece of resilient material or a cushioning element 3 such as rubber or the like between the aforesaid bolsters the channel walls 4 of the upper bolster 1 are cushioningly positioned within the channel 5 of the lower bolster 2. As shown in Figs. 1 and 3 the cushioning element 3 is shown to be so positioned between the upper and lower bolsters that portions thereof protrude from the channels of the lower bolsters and extend outwardly along the surface of the flanged portions 31 of the lower bolsters.

As indicated in Fig. 2, the resilient material 3 is positioned between bolsters 1 and 2 and extends substantially the length thereof, although satisfactory results can be obtained by the use of a shorter cushioning element or a plurality of the same located at strategic points within the channels of the lower bolster 2, such as is indicated in Fig. 4.

It is apparent from the foregoing description that by placing several pairs of bolsters together with their associated resilient members at various points on the chassis of a truck and then cradling a cargo tank 14, comprised of indivual compartments 20, upon the bolsters that cargo tank 14 will be cushioned against the ordinary shocks received when the truck passes over uneven portions of the pavement.

The upper bolster 1 is secured by suitable means such as welding to the lower portion 15 of the cargo tank 14 and the lower bolster 2 is secured by suitable means to the chassis of the truck or trailer which as disclosed by the drawings is comprised of a front chassis 6 consisting of a plurality of channeled longérons 7 which in turn are welded to a plate 8, and a rear chassis 9 comprised of a pair of roughly Z-shaped metallic longérons 11.

Affixed to the plate 8 is a conventional post 12 by means of which the cargo tank trailer is connected to the chassis of a truck which pulls the trailer.

In a preferred embodiment of the invention, hold down straps 13 of any suitable material are provided, which pass around the tank and under a lower bolster 2 directly beneath the extended portion of the resilient element 3 such as is indicated in Figures 1 and 3 of the drawings, being held in position about the bolster by means of the downwardly extending lip portions 32 of the flanges 31 of the lower bolster.

As indicated in Figure 1 the straps 13, which are located about the rearward portion of the tank, need not extend around the tank but may also be attached by suitable means directly to the tank 14. In a modification in the arrangement of the straps 13, as indicated in Figure 4, these straps may be fastened to the channel bottom 30 of the lower bolster 2 and in turn to the sides of the cargo tank in the same manner as the upper parts of the straps 13 in Figure 1, which are located at the rearward portion of the tank.

In either event, it is desirable that means be provided to tension the straps about the assembly, such as by a turnbuckle 22, to which the appropriate ends of the straps can be connected.

Thus, by adjusting the tension of the straps in this manner, the tank 14 can be drawn down and pressed against the resilient material which in turn is placed under a compression stress so that when the tank is loaded it does not sink down into the resilient material 3 and the straps 13 do not become loose. As the compartments 20 of the cargo tank are emptied the resilient material 3 is permitted to expand while continuing to force the tank against the strap. The use of such straps in conjunction with the tank mount provides an additional means of fastening which allows the tank to flex under various loads without causing a concentration of stress in the tank skin. By extending the upper bolster 1 about the outer periphery of the tank so that its length exceeds that of the lower bolster 2 it is possible to dispense with the straps 13 as a means for more securely holding the tank in position upon the truck or trailer.

As shown by Figs. 2 and 4, each pair of bolsters is preferably curved along their lengths, conforming substantially to the curvature of the cargo tank, so that in addition to functioning as a vibration or shock dampening means, they also act as a cradle for holding the cargo tank 14 in place by restraining lateral movement of the same, especially when rounding curves, although substantially the same result could be obtained by making the bolsters in the shape of a V. The particular curvature of the bolsters also serves advantageously to provide lateral as well as vertical vibration dampening means.

In addition, it will be noted that longitudinal movement of the cargo tank 14 caused by sudden stops or starts of the truck or trailer is prevented because of the particular design of the bolsters, since the upper bolsters 1 fastened to the cargo tank 14 rest within the channels 5 of the lower bolsters 2 affixed to the front and rear chassis and are locked therein.

It is apparent that the device disclosed in the foregoing description of mounting cargo tanks upon vehicles, although simple in construction and economical to manufacture serves as an excellent vibration dampening and shock absorbing means as well as a cradle support for cargo tanks.

It will be obvious that many changes or modifications may be made in the invention without departing from the spirit and scope thereof and accordingly the invention is not limited by what has been disclosed in the previous description but only by the appended claims wherein what is claimed is:

1. A device of the character described for mounting a cargo tank comprising a chassis, a plurality of substantially deep channel shaped curved lower bolsters fastened to said chassis at predetermined longitudinally spaced points thereon, a strip of resilient material of substantially the same length as a lower bolster positioned within and partially filling the channel of each of said lower bolsters in such a manner as to provide a normally open space within the lower part of the said channel and a plurality of substantially deep channel shaped curved upper bolsters, each of said latter mentioned bolsters being formed from a strip of metal separate and apart from said tank and adapted to be affixed to the walls of said tank, the channel walls of each of said upper bolsters being completely cushioningly engaged within the channel of a corresponding lower bolster by means of said strip of resilient material.

2. A device of the character described for mounting a cargo tank comprising a chassis, a plurality of deep channel shaped curved lower bolsters fastened to said chassis at predetermined longitudinally spaced points thereon, a strip of resilient material of substantially the same length as a lower bolster positioned within and partially filling the channel of each of said lower bolsters in such a manner as to provide a normally open space within the lower part of the said channel, a plurality of substantially deep channel shaped curved upper bolsters, each of said latter mentioned bolsters being formed from a piece of metal separate and apart from said tank and adapted to be affixed to the walls of said tank, the channel walls of each of said upper bolsters being completely cushioningly engaged within the channel of a corresponding lower bolster by means of said strip of resilient material, a plurality of straps affixed to said cargo tank and the extremities of each of said lower bolsters, and means for tensioning said straps.

3. A device of the character described for mounting a cargo tank comprising a chassis, a plurality of deep channel shaped first bolsters secured to said chassis, a cushioning element positioned within and partially filling the channel of each of channel shaped bolsters in such a manner as to provide a normally open space in the lower part of the said channel, and a plurality of second channel shaped bolsters, each of said latter mentioned bolsters being formed from a piece of metal separate and apart from the said tank and adapted to be affixed to the walls of the tank, the channel walls of each of said second bolsters being completely resiliently engaged within the channel of a corresponding first bolster by means of said cushioning element.

4. A device of the character described for mounting a cargo tank comprising a chassis, a plurality of deep channel shaped first bolsters secured to said chassis, a cushioning element positioned within and partially filling the channel of each of said channel shaped bolsters in such a manner as to provide a normally open space in the lower part of the said channel, a plurality of second deep channel shaped bolsters, each of said latter mentioned bolsters being formed from a piece of metal separate and apart from the tank and adapted to be affixed to the tank, the channel walls of each of said second bolsters being completely resiliently engaged within the channel of a corresponding first bolster by means of said cushioning element, a plurality of straps, one each being affixed to said cargo tank and to the extremities of each of said first bolsters and means for tensioning said straps.

5. A device of the character described for mounting a cargo tank comprising a chassis, a plurality of deep channel shaped curved first bolsters secured to the said chassis, a plurality of longitudinally spaced cushioning elements positioned within and partially filling the channel of each of said channel shaped bolsters in such a manner as to provide a normally open space within the bottom of said channel and a plurality of second channel shaped curved bolsters of substantially the same length as said first bolsters, each of said second bolsters being formed from a piece of metal separate and apart from the tank and adapted to be affixed to the tank, the channel walls and webs of each of said second bolsters being completely resiliently engaged within the channel of a corresponding first bolster by means of said cushioning elements.

6. A device of the character described for mounting a cargo tank comprising a chassis, a plurality of deep channel shaped lower bolsters secured to said chassis at predetermined longitudinally spaced points thereon, a cushioning element positioned within and partially filling the channel of each of said lower bolsters in such a manner as to provide a normally open space within the bottom of the said channel, a plurality of channel shaped upper bolsters each of said upper bolsters being formed from a piece of metal separate and apart from the tank and adapted to be affixed to the walls of the tank, the channel walls of each of said upper bolsters projecting downwardly for a substantial distance into the channel of a lower bolster so as to be completely resiliently engaged therein by means of said cushioning element, a plurality of straps each one of which passes about said cargo tank and a corresponding lower bolster, and means for tensioning said straps about the said tank and said lower bolster.

7. A device of the character described for mounting a cargo tank comprising a chassis, a plurality of transverse, curved, deep channel shaped lower bolsters secured to the said chassis at predetermined longitudinally spaced points thereon, a plurality of longitudinally spaced cushioning elements positioned within and partially filling the channel of each of said lower bolsters in such a manner as to provide a normally open space within the bottom of the said channel and between each other, a plurality of transverse channel shaped curved upper bolsters each of said latter mentioned bolsters being formed from a piece of metal separate and apart from the tank, the channel walls of each of said upper bolsters projecting downwardly for a substantial distance into the channel of a corresponding lower bolster so as to be completely resiliently engaged therein by means of said cushioning elements, a plurality of straps each one of which passes about the cargo tank and under a corresponding lower bolster and means for tensioning said straps about the said tank and said lower bolster.

8. A cargo tank mount adapted to resiliently support a cargo tank upon the chassis of a trailer and the like comprising the combination of a substantially deep channel shaped, curved lower bolster affixed to the said chassis, the channel walls of which terminate in outwardly extending flanges, a cushioning member covering the said flanges and mounted within the said lower bolster in such a manner as to partially fill the said channel and to provide a normally open space within the bottom of the said channel, and a second deep channel shaped upper bolster resiliently mounted with said lower bolster by means of said cushioning element, said upper bolster being formed from a piece of metal separate and apart from the tank, and the channel walls of said upper bolster being adapted to project downwardly for a substantial distance into the channel of said lower bolster and said channel walls of said upper bolster also terminating in outwardly extending flanges.

DONALD G. LA RUE.

REFERENCES CITED

The following references are of record in the file of this patent:

UNITED STATES PATENTS

| Number | Name | Date |
| --- | --- | --- |
| 1,123,366 | Piaggio | Jan. 5, 1915 |
| 1,933,359 | Archer | Oct. 31, 1933 |
| 2,026,501 | Jensen | Dec. 31, 1935 |